United States Patent
Zhang et al.

(10) Patent No.: US 12,005,415 B2
(45) Date of Patent: Jun. 11, 2024

(54) DISPOSABLE REACTION DEVICE, TRACER SYNTHESIZER AND METHOD FOR PRODUCING TRACERS

(71) Applicant: HANGZHOU INSPIRED BIOTECHNOLOGY INC., Zhejiang (CN)

(72) Inventors: Jianzhong Zhang, Zhejiang (CN); Yu Fang, Zhejiang (CN)

(73) Assignee: HANGZHOU INSPIRED BIOTECHNOLOGY INC., Hangzhou (CN)

( * ) Notice: Subject to any disclaimer, the term of this patent is extended or adjusted under 35 U.S.C. 154(b) by 805 days.

(21) Appl. No.: 17/059,452

(22) PCT Filed: May 29, 2019

(86) PCT No.: PCT/CN2019/088972
§ 371 (c)(1),
(2) Date: Nov. 29, 2020

(87) PCT Pub. No.: WO2019/228392
PCT Pub. Date: Dec. 5, 2019

(65) Prior Publication Data
US 2021/0220795 A1    Jul. 22, 2021

(30) Foreign Application Priority Data
May 30, 2018    (CN) .......................... 201810536256.2

(51) Int. Cl.
*B01J 19/00* (2006.01)
*B01J 19/24* (2006.01)
*B01L 3/00* (2006.01)

(52) U.S. Cl.
CPC .......... *B01J 19/0073* (2013.01); *B01J 19/24* (2013.01); *B01L 3/52* (2013.01); *B01J 2219/00011* (2013.01); *B01L 2300/044* (2013.01)

(58) Field of Classification Search
CPC .... B01J 19/00; B01J 19/0006; B01J 19/0053; B01J 19/0073; B01J 19/24; B01J 2219/00;

(Continued)

(56) References Cited

U.S. PATENT DOCUMENTS

2013/0294984 A1* 11/2013 Zhang .................. B01J 19/0093
422/558

FOREIGN PATENT DOCUMENTS

CN    201253380 Y    6/2009
CN    204407025 U    6/2015
(Continued)

OTHER PUBLICATIONS

International Search Report of PCT/CN2019/088972.
Written Opinion of PCT/CN2019/088972.

*Primary Examiner* — Natasha E Young

(57) ABSTRACT

The invention discloses a disposable reaction device, a tracer synthesizer and a method for producing a tracer. The disposable reaction device comprises: (1) a disposable reagent bottle, which is used for loading the substances required for reaction, including radioisotopes, solvents, reagents, and reactants; the load can be filled directly or through a disposable liquid pipeline into the disposable reactor; (2) disposable reactors, which are used to contain radioisotopes and at least one reagent for reaction, and can be sealed with pierceable materials; (3) disposable liquid pipelines, including evaporation elements, filling elements, retraction elements, and mass transfer pipelines. The beneficial advantages brought by the present invention are: First, there is no (Continued)

need to wait for 10 half-lives of radioactive decay before proceeding to the next tracer production. Secondly, the disposable reaction device enables the synthesis of the same or different tracers to be repeated in a short time.

6 Claims, 2 Drawing Sheets

(58) Field of Classification Search
CPC .... B01J 2219/00002; B01J 2219/00004; B01J 2219/00011; B01L 3/00; B01L 3/52; B01L 2300/00; B01L 2300/04; B01L 2300/041; B01L 2300/044; G21G 4/00
See application file for complete search history.

(56) References Cited

FOREIGN PATENT DOCUMENTS

| | | |
|---|---|---|
| CN | 108854926 A | 11/2018 |
| CN | 208642676 U | 3/2019 |
| WO | WO-2013185142 A1 * 12/2013 | ........ B01L 3/502715 |

* cited by examiner

DISPOSABLE REACTION DEVICE, TRACER SYNTHESIZER AND METHOD FOR PRODUCING TRACERS

CROSS-REFERENCE TO RELATED APPLICATIONS

This application is a national stage application of PCT Application No. PCT/CN2019/088972. This application claims priority from PCT Application No. PCT/CN2019/088972, filed May 29, 2019, and CN Application No. CN 201810536256.2, filed May 30, 2018, the contents of which are incorporated herein in the entirety by reference.

TECHNICAL FIELD

The invention relates to the technical field of radiopharmaceutical synthesizer, in particular to a disposable reaction device, a tracer synthesizer and a method for producing a tracer.

BACKGROUND

Molecular imaging has developed rapidly in recent years. PET-CT (Positron Emission Tomography/Computed Tomography) uses positron radioactive tracers to detect diseases, which allows for early diagnosis of human cancers as well as the diseases of heart and nervous systems. In order to produce radioactive tracers, cyclotron is used to produce radionuclides such as 18F, 11C, and 13N, and then these radionuclides are labeled on different chemical substrates through a chemical synthesis module (also called synthesizer) to synthesize various tracers (radiopharmaceuticals) for clinical uses. Because the positron radioactive tracers have the characteristics of high radioactivity and short half-life, they have to be synthesized with an automatic radiochemical synthesizer. For PET-CT imaging, although many new positron radiopharmaceuticals have been developed, 18F-PDG remains as the most commonly used tracer in the clinics for disease diagnosis and prognosis.

At present, the synthesizers need to be cleaned after the reaction, and wait for 10 half-lives of radioactive decay before proceeding to the next tracer production. Generally, this process takes more than 24 hours. This brings up the following issues:

1. Time is wasted, it takes more than 24 hours to perform a synthesis reaction.
2. Radioactive materials may be wasted. During the synthesis process of radiotracers, radioactive 18F is first generated through an accelerator. Even if the required amount of 18F is small, a bombardment is necessary, which results in low utilization and increase costs.
3. It may pollute the environment and threaten personal safety. Cleaning equipment not only wastes a lot of manpower and material resources, but the cleaning fluid may also cause environmental pollution and threaten the safety of the operating staff.
4. It takes a lot of time to clean and examine the cleaning effect, which directly affects the efficiency of synthesis.

In order to solve the above problems, there is a need for a radiotracer synthesis device that does not require cleaning and can be used to repeat synthesis within a short period of time.

SUMMARY OF THE INVENTION

In order to solve the above-mentioned problems, the present invention provides a disposable reaction device, a tracer synthesizer and a method for producing a radioactive tracer. Among them, the disposable reaction device can be completely removed after use, and there is no cleaning involved, which solves all the related problems of time-waiting, equipment-cleaning, material-wasting, and pollution. The tracer can be synthesized repeatedly within a short period of time, and it is more in line with the requirements of the GMP.

The invention provides a disposable reaction device, including:

Disposable reagent bottles, which are used to load the materials required for the reaction, including radioisotopes, solvents, reagents, and reactants; the contents can be filled into the disposable reactor directly or through a disposable liquid pipeline; the disposable reagent bottles can be in various shapes and materials, as long as it meets the requirements of the loaded materials; the disposable reagent bottle can be easily removed after use.

A disposable reactor, which is used to contain the radioisotope and at least one reagent for the reaction, and can be sealed with a pierceable rubber.

Disposable liquid pipelines, including evaporation elements, filling elements, retrieving elements, and mass transfer pipelines; the evaporation elements, filling elements, and retrieving elements all include needle a, needle b and fixing pieces; needle a and needle b are pierced and fixed in the fixing piece; the evaporation elements, filling elements, and retrieving elements have the same structure, however different names are given to them because the purposes and methods of use are different among them. The evaporating elements are used to dry, evaporate or concentrate the contents in the disposable reactor. Nitrogen or other inert gas is injected through the needle a, whereas the gas and moisture are discharged through the needle b. The filling elements are used to fill the materials from the disposable reagent bottle into the disposable reactor, materials are filled through the needle a, and the gas is discharged through the needle b. The retrieving elements are used to remove the reaction intermediates or products out of the disposable reactor. Gas is filled through the needle b to increase the pressure in the disposable reaction bottle, and the contents in the disposable reaction bottle is retrieved through the needle a. One end of the mass transfer pipeline can be connected to the disposable reagent bottle, and the other end is connected to the needle a of the disposable liquid pipeline; the other end of the needle a can be directly or pierced through the pierceable rubber and then extend into the disposable reactor. The fixing piece is composed of a sealing piece and a circular ring, and the bottom of the circular ring is fixedly connected to the sealing piece. The needle a is 7-shaped, one end passes through the side wall of the ring, and the other end passes through the sealing piece; the height of the end of the needle b in the ring is lower than the height of the ring, and the other end of the needle b is shorter than the needle a on the same side. Needle b is shorter in the reaction flask than needle a, which is more conducive to gas discharge or injection.

Disposable reagent bottles, disposable liquid pipelines, and disposable reactors can be removed after use.

The radioisotope described here for the synthesis of radioactive tracers is fluorine-18, and the described disposable reactor can also be used for producing the radioactive tracers labeled with other radionuclides such as 11C and 13N.

The present invention also provides a tracer synthesizer, which comprises the above-mentioned disposable reaction device, a connecting piece and a needle c, one end of the needle c passing through the connecting piece. The upper end of the ring is connected to the bottom of the connecting piece, and external air pressure is applied to connect the fixing piece with the connecting piece. After the air pressure is released, the fixing piece can be separated from the connecting piece. In the present invention, the fixing piece and the connecting piece are connected through external air pressure, instead of commonly used methods such as riveting or screwing. Fully automated synthesis is easily accomplished because the connection and separation of fixing and connecting pieces can be very convenient. Meanwhile, the production of radioactive tracers is commonly carried out in a closed environment. Our automated synthesizer eliminates the manual cleaning or replacement steps of the device, and therefore significantly reduces the radiation risk of the operating staff and improve the efficiency for repeated synthesis of tracers. When the fixing piece and the connecting piece are connected by external air pressure, the fixing piece and the connecting piece form a closed space. Although there is a fault in the middle of the needle c and the needle b, they are connected through the closed space to form a complete channel, allowing to fill gas into the reaction bottle or exhaust gas from the reaction bottle. Because the needle c is not directly connected to the needle b, the needle c and the connector do not touch the reactants during the synthesis. There is no need to remove them after the reaction, which simplifies the production steps and reduces the cost.

The present invention also provides a method for producing tracers with the above-mentioned synthesizer, which includes the following steps:

(A) The radioisotope and at least one reagent and/or solvent and/or reactant loaded in the disposable reagent bottle are sequentially and gradually filled into the disposable reaction bottle through the mass transfer pipeline and the filling elements;

(B) Dry, evaporate or concentrate the contents in the disposable reaction bottle through the evaporation elements;

(C) Carrying out radiochemical reactions to produce radioactive chemical products or radioactive intermediates for further reaction to convert radioactive intermediates into radiochemical products;

(D) Retrieve radiochemical products or radioactive intermediates from the reaction bottle through the retrieving elements and mass transfer pipelines;

(E) Remove the filling elements, evaporation elements, retrieving elements, mass transfer lines and disposable reactors and replace with new ones for next round production.

Compared to the tracer synthesizers on the market, the advantages brought by the present invention include:

1. There is no need to wait for 10 half-lives of radioactive decay before the next round production. The disposable reaction devices allow for repeated synthesis of same or different tracers within a short period of time, which greatly improves the efficiency of tracer production and clinic use of tracers for PET-CT imaging.
2. There is no need to clean the synthesizer, which greatly saves time, manpower and material resources.
3. Significantly reduces the potential environmental pollution caused by cleaning fluids and radiation risk to operating staff.

DESCRIPTION OF THE DRAWINGS

In order to clearly explain the technical solutions of the present invention, a few examples and the descriptions of enclosed drawings are briefly introduced as below. Obviously, the drawings and examples in the following description are limited representation of the present invention. One can obtain additional drawings or examples based on our description without creative work.

The details of the present invention, including the structure and operation of the tracer synthesizer can be partially obtained through these drawings, wherein the same reference numerals indicate the same parts, and the arrows indicate the moving direction of the moving parts.

Figure 1:
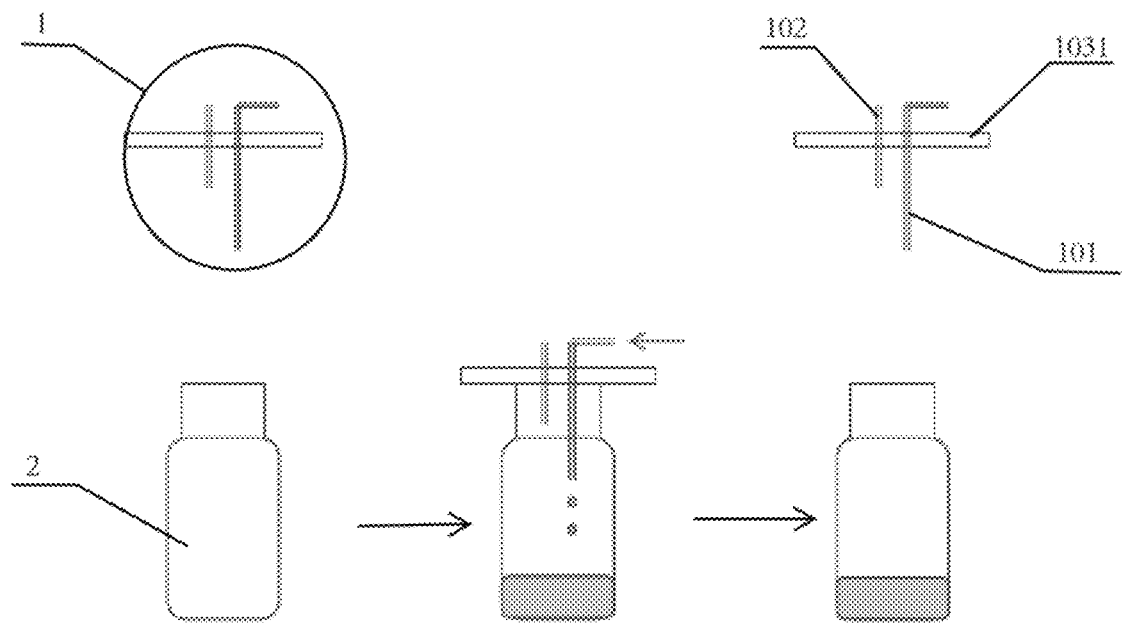
FIG. 1 shows the filling process of non-disposable filling elements.

The labels in the figure are: disposable liquid pipe (1), needle a (101), needle b (102), fixing piece (103), sealing piece (1031), ring (1032), disposable reaction bottle (2), pierceable rubber (201), connecting piece (3), needle c (4).

DETAILED IMPLEMENTATION

The technical solutions of the present invention are reflected in the following description in conjunction with the accompanying drawings and examples. Obviously, the described examples are only a part of the embodiments of the present invention. All other embodiments obtained without creative work shall fall into the scope of the present invention.

The synthesis of a radiotracer requires a radioisotope and at least one reaction reagent. The synthesis of a radiotracer can involve one or more reaction steps, producing radioactive intermediates or radiochemical products. The radiochemical products can be further purified as a clinically usable tracer. The synthesis of radiotracers also involves other equipment, such as an accelerator that produces radionuclides or a temperature control element that provides energy. However, these equipment and related procedures are not described and the present invention is focused on describing a disposable reaction device and a fully automated tracer synthesizer. The present invention may be implemented in many different forms and should not be construed as being limited to the embodiments set forth herein. On the contrary, these embodiments are provided to ensure that the disclosure is thorough and complete, and to ensure that it fully conveys the scope of the present invention to those skilled in the relevant fields.

Embodiment Example 1

As shown in FIG. 1, the filling process of the non-disposable filling element used in the existing tracer synthesizers is as follows: the reaction bottle 2 moves below the liquid pipe 1, the liquid pipe 1 moves down, and the reactants pass through the needle a 101 to fill in the reaction bottle 2 and vent through the needle b 102. After the reaction is completed, the liquid pipe 1 moves upward.

Figure 2:
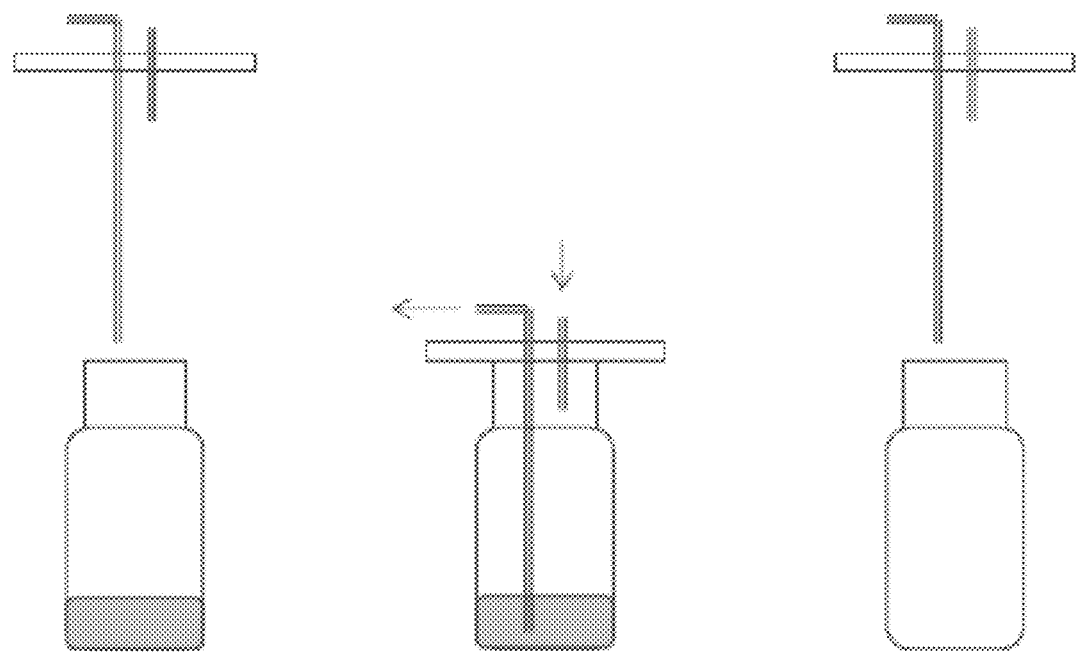
FIG. 2 shows the retrieving process of non-disposable retrieving elements.
Figure 3:
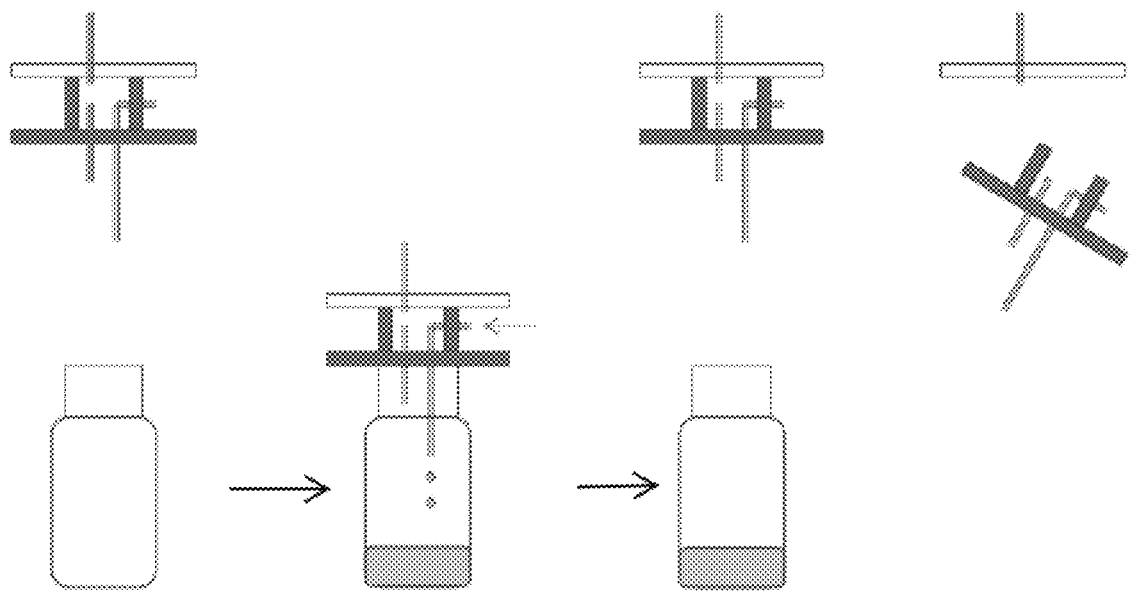
FIG. 3 shows the filling process of the disposable filling element described in the present invention.
Figure 4:
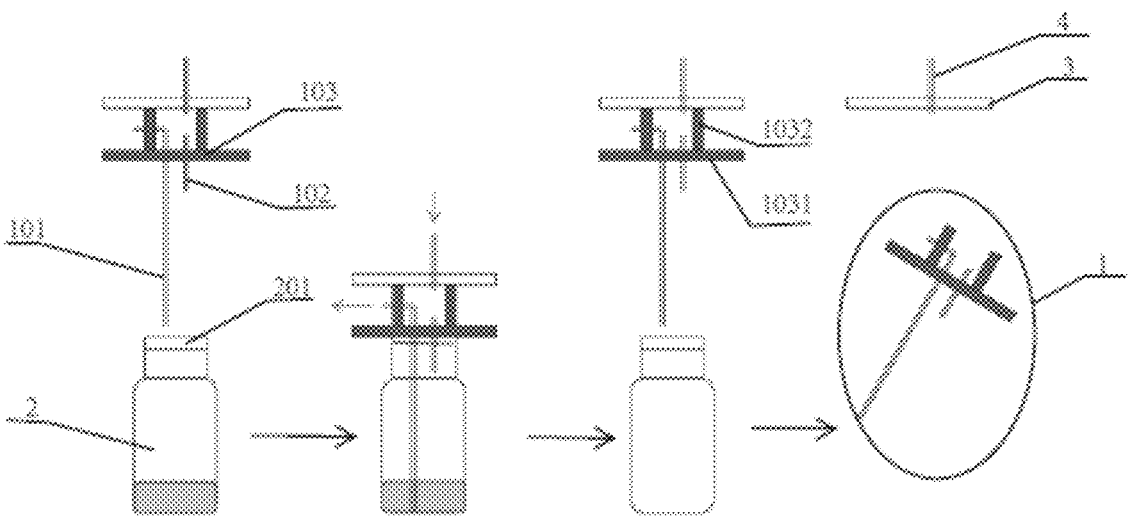
FIG. 4 shows the retrieving process of the disposable retrieving element described in the present invention.

After the reaction and the evaporation process, the reaction bottle 2 is moved below other liquid pipes to prepare for the step of taking out the contents of the reaction bottle 2. As shown in FIG. 2, the reaction bottle 2 moves below the other liquid pipe 1. Liquid pipe 1 then moves down, gas is injected through the needle b 102, and then the contents are taken out through needle a 101.

It can be seen from FIG. 1 and FIG. 2 that the liquid pipe 1 is composed of a sealing piece 1031 as well as the needle a 101 and needle b 102 passing through the sealing piece 1031. The liquid pipe 1 is contaminated by radionuclides and the reaction liquid during the reaction. However, it is not a disposable device. If the next reaction is desired, the liquid pipe 1, reaction bottle 2 and other pieces need to be cleaned and wait for 10 half-lives of radioactive decay before proceeding to the next round tracer production.

Embodiment Example 2

The invention provides a disposable reaction device, including:

Disposable reagent bottles, which can be multiple and are respectively loaded with radioisotopes, solvents, reagents, and reactants; the contents of the disposable reagent bottles can be sequentially and gradually filled into the disposable reactor 2 through the disposable liquid pipeline 1.

Disposable reactor 2, which is used to contain the radioisotope and at least one reaction reagent for the synthetic reaction, and can be sealed with a pierceable rubber 201. Although there is a sealing piece 1031 for sealing during the reaction, after adding the pierceable rubber 201 to seal, the liquid pipe 1 can be kept in a sealed state after the liquid pipe 1 is removed, which avoids the effect of radionuclide radiation.

Disposable liquid pipeline 1, which includes an evaporation element, a filling element, a retrieving element, and a mass transfer line; the evaporation element, the filling element, and the retrieving element all include a needle a 101, a needle b 102, and a fixing piece 103; the needle a 101 and the needle b 102 both pierce through and are fixed in the fixing piece 103; the evaporation element is used to dry, evaporate or concentrate the contents in the disposable reactor. Nitrogen or other inert gas is injected through the needle a 101, and the gas and moisture are discharged through the needle b 102. The filling element is used to fill the materials from the disposable reagent bottle into the disposable reactor, with the materials filled through the needle a 101, and gas discharged through the needle b 102. The retrieving element is used to remove the reaction intermediate or product out of the disposable reactor, with gas filled through the needle b 102 to increase the pressure in the disposable reaction bottle 2, and the contents in the disposable reaction bottle 2 retrieved through the needle a 101. One end of the mass transfer pipeline cane be connected with a disposable reagent bottle, and the other end can be connected with the needle a 101 of the disposable liquid pipeline; The fixing piece 103 is composed of a sealing piece 1031 and a circular ring 1032, and the bottom of the circular ring 1032 is fixedly connected to the sealing piece 1031. The needle a 101 is 7-shaped, one end passing through the side wall of the ring 1032, and the other end passing through the sealing piece 1031; the height of the end of the needle b 102 in the ring 1032 is lower than the height of the ring, and the other end of the needle b 102 is shorter than the needle a 101 on the same side. The needle b 102 is shorter in the reaction bottle 2 than the needle a 101 is more conducive to the discharge or injection of gas.

The disposable reagent bottle, disposable liquid pipe 1, and disposable reactor 2 can be removed after use and replaced with new ones for next round production.

Embodiment Example 3

The present invention also provides a tracer synthesizer, which includes the above-mentioned disposable reaction device, a connecting piece 3 and a needle c 4. One end of the needle c 4 passes through the connecting piece 3. The upper end of the ring 1032 is connected to the bottom of the connecting piece 3, and the fixing piece 103 is connected to the connecting piece 3 by applying external air pressure. After the air pressure is released, the fixing piece 103 can be separated from the connecting piece 3.

Embodiment Example 4

The present invention also provides a method for producing a tracer with the above-mentioned synthesizer, which includes the following steps:

(A) The filling element is connected with the connecting piece 3 by applying external air pressure; the moving device sends the reaction bottle 2 below the filling element; the filling element moves down, the needle 101 and the needle 102 penetrate the pierceable rubber 201 and then extend into the reaction bottle 2. One end of the mass transfer pipeline is connected to the reagent bottle, whereas the other end is connected to the needle 101 of the filling element. The radioisotope and at least one reagent and/or solvent and/or reactant loaded in the disposable reagent bottle are gradually and sequentially filled into the disposable reaction bottle 2 through the needle 101;

(B) The moving device sends the reaction bottle 2 below the evaporation element, the evaporation element moves down, the needle 101 and the needle 102 penetrate the pierceable rubber 201 and then extend into the reaction bottle 2; Nitrogen is filled in through the needle 101, and the needle 102 is used to remove gas and moisture; The evaporation element is used to dry, evaporate or concentrate the contents in the disposable reaction bottle. After evaporation, the evaporation element moves upward;

(C) The mobile device sends the reaction bottle 2 below the sealing piece 1031, and the sealing piece 1031 moves down to the reaction bottle 2. The reaction bottle 2 is sealed to perform the radiochemical reactions, producing radioactive chemical products or radioactive intermediates for further reaction to convert radioactive intermediates into radiochemical products; The sealing piece 1031 moves up after the reaction;

(D) The moving device sends the reaction bottle 2 below the retrieving element, and the retrieving element moves down to the reaction bottle; The needle 101 and the needle 102 penetrate the pierceable rubber 201 and then extend into the reaction bottle 2; Gas is filled through the needle 102, and the contents in the reaction bottle 2 are retrieved through the needle 101;

(E) Remove the filling element, evaporation element, retrieving element, mass transfer pipeline and disposable reactor bottle 2. The reaction steps are completed.

Each step utilizes a different temperature control unit to control temperature. The mobile devices and temperature control units involved are built with existing technologies.

It should also be noted that in this article, relational terms such as "first" and "second" are only used to distinguish one entity or operation from another entity or operation, and do not necessarily require or imply actual relationship or order is present among these entities or operations. Moreover, the terms "include", "comprised of", or any other variants thereof are intended to cover non-exclusive inclusion, so that the process, method or device not only includes a series of described elements but also includes those elements that are not described in this article as well as other elements inherent to this process, method, or device. When there is no additional restriction, the element defined by the sentence "including a . . . " does not exclude the existence of other identical elements in the process, method, or device.

The embodiment examples in this article are described in a progressive manner, and each embodiment example focuses on a different aspect of this invention, and these embodiment examples can be referred to each other.

The disclosure of the embodiment examples enables the implementation and use of the present invention in relevant fields. Various modified versions of these embodiment examples will be obvious to those skilled in the field, and the general principles defined herein can be implemented in other embodiment examples without departing from the spirit or scope of the present invention. Therefore, the present invention will not be limited to the embodiment examples shown in this article, but should conform to the widest scope consistent with the principles and novel features disclosed in this article.

What is claimed is:

1. A disposable reaction device, comprising:
   disposable reagent bottle, used to load the materials required for the reaction, including radioisotopes, solvents, reagents and reactants; the disposable reagent bottle can directly or through a disposable liquid pipeline fill the materials required for the reaction to the disposable reaction device;
   the disposable reaction device is used to contain a radioisotope and at least one reagent for reaction; the disposable reaction device is sealed by a pierceable rubber;
   the disposable liquid pipeline, including needle a, needle b, fixing piece and a mass transfer pipeline;
   the needle a and the needle b are arranged side by side with each other, and the needle a and the needle b are both pierced downward and fixed in the fixing piece;
   one end of the mass transfer pipeline is connected to a disposable reagent bottle, and the other end is connected to one end of the needle a on the disposable liquid pipeline;
   the other end of the needle a directly pierces through the pierceable rubber and then extends into the disposable reaction device;
   wherein the fixing piece comprises a sealing piece and a ring and the bottom of the ring is fixedly connected to the sealing piece;
   characterized in that the needle a is in the shape of "¬", and one end of the needle a passes through the side wall of the ring, and the other end goes down through the sealing piece; a segment of the needle b in the ring is lower than the height of the ring, and the other end of the needle b is shorter than the needle a.

2. The disposable reaction device according to claim 1, wherein the radioactive isotope is fluorine-18.

3. UA tracer synthesizer, comprising the disposable reaction device according to claim 1, a connecting piece, and a needle c, one end of the needle c passing through the connecting piece.

4. The tracer synthesizer according to claim 3, wherein an upper end of the ring is connected to the bottom of the connecting piece, and by applying external air pressure, the fixing piece can be connected with the connecting piece, after the air pressure is released, the fixing piece can be separated from the connecting piece.

5. A method for producing a tracer by a synthesizer according to claim 3, comprising the following synthetic steps:
   (A) the radioisotope and at least one reagent and/or solvent and/or reactant loaded in the disposable reagent bottle are sequentially and gradually filled into the disposable reaction bottle through the mass transfer pipeline and the filling element;
   (B) dry, evaporate or concentrate the contents in the disposable reaction bottle through the evaporation element;
   (C) carrying out radiochemical reactions to produce radioactive chemical products or radioactive intermediates to further react to convert radioactive intermediates into radiochemical products;
   (D) retrieve radiochemical products or radioactive intermediates from the reaction bottle through retrieving elements and mass transfer pipelines;
   (E) remove filling elements, evaporation elements, the retrieving elements, mass transfer lines and disposable reactors;
   the evaporation element, the filling element and the retrieving element all include the needle a, the needle b and the fixing piece;
   the evaporation element is used for drying, evaporating or concentrating the contents in the disposable reaction device, injecting nitrogen through the needle a, and exhausting the gas and moisture through the needle b;
   the filling element is used for filling the material contained in the disposable reagent bottle into the disposable reaction device, filling the material through the needle a, and exhausting the gas through the needle b; and
   the retrieving element is used to remove the intermediate or product after the reaction out of the disposable reaction device, inject gas through the needle b to increase the pressure in the disposable reaction bottle, and retrieve the contents of the disposable reaction bottle through the needle a.

6. A tracer synthesizer, comprising the disposable reaction device according to claim 2, a connecting piece, and a needle c, one end of the needle c passing through the connecting piece.

* * * * *